US008009810B2

(12) United States Patent
Seidberg et al.

(10) Patent No.: US 8,009,810 B2
(45) Date of Patent: Aug. 30, 2011

(54) EMERGENCY RESPONDER REPLY SYSTEM AND RELATED METHODS

(75) Inventors: Daniel R. Seidberg, Manlius, NY (US); Bradley M. Pinsky, Manlius, NY (US)

(73) Assignee: IAM Technologies LLC, Syracuse, NY (US)

( * ) Notice: Subject to any disclaimer, the term of this patent is extended or adjusted under 35 U.S.C. 154(b) by 502 days.

(21) Appl. No.: 12/017,208

(22) Filed: Jan. 21, 2008

(65) Prior Publication Data

US 2008/0175356 A1 Jul. 24, 2008

Related U.S. Application Data

(60) Provisional application No. 60/885,960, filed on Jan. 22, 2007.

(51) Int. Cl.
*H04M 11/04* (2006.01)

(52) U.S. Cl. .......................................... 379/37; 709/225

(58) Field of Classification Search .................... 379/39; 709/225; 340/573.1
See application file for complete search history.

(56) References Cited

U.S. PATENT DOCUMENTS 3,864,674 A 2/1975 Worsham et al.
5,162,776 A 11/1992 Bushnell et al.
5,414,408 A 5/1995 Berra
5,767,788 A 6/1998 Ness
5,793,882 A 8/1998 Piatek et al.
5,960,337 A 9/1999 Brewster et al.
6,226,510 B1 * 5/2001 Boling et al. ................. 455/521
6,642,844 B2 11/2003 Montague
6,680,998 B1 1/2004 Bell et al.
6,701,156 B2 3/2004 Akhteruzzaman et al.
6,882,307 B1 4/2005 Gifford
6,882,837 B2 4/2005 Fernandez et al.
6,917,288 B2 7/2005 Kimmel et al.
6,998,978 B2 2/2006 Kirkeby
7,026,925 B2 4/2006 Roche et al.
7,047,114 B1 5/2006 Rogers
7,091,852 B2 8/2006 Mason et al.
7,212,506 B2 5/2007 Varney et al.
7,245,216 B2 7/2007 Burkley et al.
7,251,321 B2 7/2007 Lesniak et al.

(Continued)

FOREIGN PATENT DOCUMENTS

JP 2238596 9/1990
JP 2002183291 6/2002
JP 2006215855 8/2006

OTHER PUBLICATIONS

Author unknown, "VPI Performance: Real-time Web Dashboards, Reports and Tickers; Root Cause Performance Analytics; Targeted Coaching and Notifications," printed from http://vpi-corp.com, date unknown, pp. 1-3.

(Continued)

*Primary Examiner* — Curtis Kuntz
*Assistant Examiner* — Maria El-Zoobi
(74) *Attorney, Agent, or Firm* — Hoffman Warnick LLC

(57) ABSTRACT

An emergency responder reply system (ERRS) and method are disclosed that minimize, and in many instances eliminate, the delays frequently associated with responding to emergency and other events requiring response services. In one embodiment, a method includes receiving a telephonic response from a responder to a dispatch for services; obtaining information about the responder from which a telephonic response has been received; and providing the information via an Internet-based web portal.

45 Claims, 6 Drawing Sheets

U.S. PATENT DOCUMENTS

| | | | | |
|---|---|---|---|---|
| 7,271,704 | B2 | 9/2007 | McSheffrey et al. | |
| 7,298,276 | B2 | 11/2007 | Perez Garcia | |
| 7,323,980 | B2 | 1/2008 | Faulkner et al. | |
| 7,336,166 | B2 | 2/2008 | Akamatsu | |
| 7,355,507 | B2 | 4/2008 | Binning | |
| 7,538,666 | B2 | 5/2009 | Campman | |
| 7,633,387 | B2 | 12/2009 | Carmichael et al. | |
| 7,746,794 | B2 | 6/2010 | Sink | |
| 7,898,410 | B2 | 3/2011 | Schurter | |
| 2003/0012344 | A1 | 1/2003 | Agarwal et al. | |
| 2003/0028536 | A1 | 2/2003 | Singh et al. | |
| 2003/0197615 | A1* | 10/2003 | Roche et al. | 340/573.1 |
| 2004/0105529 | A1* | 6/2004 | Salvucci et al. | 379/45 |
| 2004/0145481 | A1* | 7/2004 | Dilbeck et al. | 379/37 |
| 2004/0192353 | A1 | 9/2004 | Mason et al. | |
| 2004/0225733 | A1* | 11/2004 | Tesink et al. | 709/225 |
| 2005/0003797 | A1 | 1/2005 | Baldwin | |
| 2005/0265527 | A1 | 12/2005 | Creamer et al. | |
| 2005/0271186 | A1* | 12/2005 | Lichorowic et al. | 379/37 |
| 2005/0282518 | A1 | 12/2005 | D'Evelyn et al. | |
| 2006/0133582 | A1 | 6/2006 | McCulloch | |
| 2006/0224797 | A1 | 10/2006 | Parish et al. | |
| 2007/0030144 | A1* | 2/2007 | Titus et al. | 379/39 |
| 2007/0083409 | A1 | 4/2007 | Dilbeck et al. | |
| 2007/0103294 | A1 | 5/2007 | Bonecutter et al. | |
| 2008/0192731 | A1 | 8/2008 | Dickinson | |
| 2009/0045942 | A1 | 2/2009 | Schurter | |

OTHER PUBLICATIONS

Author unknown, "Page Confirm," printed from http://www.trumsoft.com on Nov. 30, 2009, p. 1.

Kuntz, C., "PCT International Preliminary Report on Patentability," Nov. 30, 2009, pp. 1-8, U.S. International Preliminary Examining Authority.

IAM Technologies, "Brochure & Pricing distributed at Feb. 24-25, 2007 Finger Lakes Conference," 6 pages.

IAM Technologies, "Apr. 5, 2007 Screen Shots of live, functional system at http://www.iamresponding.com," 28 pages.

IAM Technologies, "Original PowerPoint slide show from www.iamresponding.com, showing primary system functionality," 12 pages.

IAM Technologies, Brochure and Pricing distributed at May 16-19, 2007 Harrisburg Fire Expo, 6 pages.

IAM Technologies, "May 21, 2007 email blast by Chief Goldfeder," 2 pages.

IAM Technologies, "May 21, 2007 Email blast from Pennsylvania State Fire Commissioner Ed Mann," 2 pages.

IAM Technologies, "Jun. 2007 New York Chief's Show pre-show mailing," 2 pages.

IAM Technologies, "Jul. 2007 Innovation Award Press Release," 3 pages.

Green, Jack R., "The Encyclopedia of Police Science", vol. 1, pp. 230-232.

Australian Patent Application 2008208041, Examiner's Report dated Dec. 24, 2010.

New Zealand Patent Application No. 578654, Examination Report, Feb. 10, 2011.

International Application No. PCT/US08/51566, International Search Report and Written Opinion, May 5, 2008.

* cited by examiner

EMERGENCY RESPONDER REPLY SYSTEM AND RELATED METHODS

CROSS REFERENCES

This application claims the benefit of U.S. Provisional Application No. 60/885,960, filed Jan. 22, 2007, which is hereby incorporated by reference.

BACKGROUND

1. Field of the Disclosure

This disclosure relates generally to emergency response communications.

2. Related Art

Emergency service agencies and other emergency and incident response service providers presently have no efficient or reliable method of obtaining timely information from their off-site members (employees, affiliates and/or volunteers) about: whether members are available to respond to dispatches; which members are available to respond to dispatches; whether members are responding to dispatches; the time within which members will respond to dispatches; or the location to which members will be responding (scene, station or other location). Emergency service and other service providers include, but are not limited to: fire departments; ambulance agencies and services; first-responder agencies; search and rescue teams, hazardous materials response teams, dive teams, rope rescue teams mine safety rescue teams and other local, state and federal technical rescue teams; incident command and/or response centers; hospitals; medical providers and provider networks; police departments; fire and burglary alarm companies; security companies; federal and state emergency management agencies; federal and state departments of homeland security; nuclear facilities; the National Geophysical Data Center; federal, state and local centers for disease control; poison control centers; state and local municipalities and agencies; and any other similar service providers which provide a need for, or provide, response services for any event or incident which requires response services. Dispatch originating entities responsible for community-wide and/or local dispatch of emergency service agencies (also known as public safety answering points) similarly have no efficient or reliable method of timely obtaining such information about either the on-site or off-site members of the teams/agencies being dispatched by such centers. Similar difficulties are encountered by non-emergency, service-based agencies and entities which are responsible for mobilizing off-site employees and/or volunteers to incidents which require the services of such individuals.

In the emergency services field, fire, police, ambulance and other first-responder agency members and members of technical rescue and/or response teams (collectively "members") are generally dispatched for both emergency and non-emergency incidents either by their agency's own dispatch center or by a community-based (village, township, county or province) dispatch center, such as a 911 or E-911 center. The most common method of dispatch employed in the field is a pager system activated by the dispatch center which provides either an audible message or digital display to pagers carried by members of emergency service agencies within the dispatch center's territory. Such pagers typically are capable of receiving dispatch information, but they rarely have transmission capabilities.

Dispatch centers and dispatched teams/agencies generally have no efficient or reliable means by which to timely receive any information about which members of a dispatched team/agency are available to respond to the dispatch, which members are currently responding, the time frame within which members will respond, or the location to which members will be responding. As a result, emergency and non-emergency services are frequently delayed while a dispatch center and/or the dispatched team/agency itself awaits information about whether the dispatched team/agency has sufficient members responding to a dispatch. Avoidable delays in the provision of emergency services are frequently associated with the loss of life and/or property, and any delays in the provision of such services are undesirable.

In many communities, dispatch centers (regional and department based) wait a predetermined amount of time—commonly between two and five minutes—after the issuance of an initial dispatch via a pager or comparable system to receive a telephone or radio call or other electronic communication from the dispatched team/agency in order to learn whether the dispatched team/agency has a sufficient number of members responding to the dispatch to provide the necessary services. This may be referred to as a "first activation timeframe" (FAT). Such notification often requires either a radio or telephone call or other electronic communication from a member of the dispatched team/agency, and requires the answering and processing of such information by one or more persons at the dispatch center. Such communications require, and undesirably consume, open telephone lines and/or radio frequencies. Because the dispatched team/agency has no reliable or efficient means by which to timely know which of its off-site members may be en route to either the station, to the scene of the incident or to any other designated location, the dispatched team/agency is frequently unable to inform the dispatch center within the FAT whether it will have sufficient members available to respond in a timely manner to the incident for which it was dispatched.

When a dispatch center either receives no information from the dispatched team/agency within the FAT, or learns within such timeframe that the dispatched team/agency does not yet have sufficient members responding to the underlying incident, common industry practice is for the dispatch center to issue a second dispatch to the members of the dispatched team/agency, a practice also known as a second activation. A similar protocol to the FAT is then typically followed, with the dispatch center again waiting a predetermined length of time (now referred to as the "second activation timeframe" (SAT)) to receive information from the dispatched team/agency about the members responding to the dispatch. This again often requires either a radio or telephone call or other form of electronic communication from a member of the dispatched team/agency, and requires the answering and processing of such information by one or more persons at the dispatch center. Also, again required are available telephone lines and/or radio frequencies, which become consumed by such communications. During the SAT, the dispatched team/agency again has no reliable or efficient means by which to timely know which of its off-site members may be en route to the station, scene or other designated location.

If the dispatched team/agency either does not respond within the SAT, or responds that it has insufficient personnel to adequately respond to the underlying incident, the dispatch center may then dispatch the members of one or more other agencies either to respond with, or in lieu of, the initially dispatched team/agency. This again is accompanied by a predetermined period of time, and the same first activation and second activation process described above for the additionally dispatched agencies, during which further service provision delays are encountered while waiting for the additionally dispatched team/agency or agencies to assemble personnel.

Just as was the case with the initially dispatched team/agency, the additionally dispatched team/agency or agencies have no reliable or efficient means by which to timely know which off-site members may be en route to either the station or to the scene, station or other designated location. Additionally, dispatched agencies are subject to the same delays encountered with the initially dispatched team/agency.

The time spent awaiting information concerning members available to respond to dispatches during the FAT, the SAT and the activation of subsequent teams/agencies, whether singularly or cumulatively, results in delays in the provision of the requested services. Such delays are undesirable within the emergency services field, and are contrary to the interest of the public served by emergency service agencies.

Similar delays, uncertainty and inefficiencies are encountered by non-emergency service entities which dispatch or otherwise provide a need for service to off-site employees and/or volunteers.

Emergency service dispatch systems typically consist of dispatch centers (or public safety answering points (PSAP)) which receive calls for emergency and non-emergency service needs from members of the public. Such dispatch centers typically serve as community-wide dispatch services, and dispatch the members of the appropriate teams/agencies to reply to such calls for assistance, or transfer the call for assistance to the appropriate team/agency, which then dispatches its own members. Dispatches of agencies and their members, whether by a community-wide dispatch center, or by an agency specific dispatch center, are typically accomplished by transmitting an audible and/or digital display notification to pagers carried by members of such agencies. Such pagers typically are capable of receiving dispatch information, but rarely have transmission capabilities.

Dispatched members typically have no efficient means by which to communicate with either the dispatch center, or with the members' agency, to inform the dispatcher and/or agency whether they will be responding to the dispatch, or, if so, when and where they will be responding. There are presently two methods of such communication, each of which is associated with time delays, inconvenience, consumption of resources, inadequate information, and the need for personnel that are not typically employed by, or associated with, emergency service agencies.

First, the responding dispatched members can call (via a telephone call or radio call/transmission) either their team/agency, or the dispatch center that dispatched them, to inform them that they are responding, and when. This requires that a call be placed to either the team/agency or the dispatch center. Sufficient personnel must be available at the point called in order to receive such calls, and to record the pertinent information of the members responding. If such a call is made to the member's team/agency, the dispatch center will not be advised of such information, unless the team/agency then places at least one separate phone or radio call to the dispatch center to inform the dispatch center of the status of responding members. Similarly, if the call is made by the responding member to the dispatch center, the member's team/agency will not be advised of such information, unless the dispatch center then places at least one separate phone or radio call to the team/agency to inform the agency of the status of responding members. In a field where any delay is significant and undesirable, such calls consume valuable time of the responding members, and of personnel at both the dispatched teams/agencies and the dispatch centers. The personnel resources of both the dispatched teams/agencies and dispatch centers are resources that are more efficiently utilized when allocated to tasks other than answering and placing calls reporting upon the status of responding members. Likewise, the time of responding members is more efficiently and safely spent responding to the station and/or scene than waiting to speak, and then speaking, with either the member's agency or dispatch center. Further, such communications require the availability of sufficient telephone lines, radios and/or radio frequencies, and undesirably consume such resources.

The second related art presently available for responding members to reply to their team/agency and/or dispatch center is through text messaging or short message services (SMS). Several systems in the field enable dispatch information to be forwarded to members of a dispatched team/agency through either text message or SMS via telephones or other hand held devices, such as personal digital assistants (PDAs), through which responding members may then reply, again via text message or SMS. Text or SMS notifications generally represent supplemental dispatches of the primary dispatch pager system already implemented by the dispatch system and/or center, and therefore require a certain degree of duplication of services and/or personnel in a field where time and resources are critical.

Undesirable problems involving delay and personnel similar to those associated with the telephone/radio reply system summarized above also apply to text and SMS systems, whether they are used as primary or supplemental dispatch systems. In order for text or SMS systems to be initiated, personnel or systems must be available at either the dispatch center or the dispatched team/agency to enter the text for the text message or SMS dispatch into a text or SMS system, and to activate the system so as to forward the appropriate message to the appropriate members. Most frequently, this would require that: (1) a member of the dispatched team/agency be present at the agency's station when the initial dispatch is received by that agency from a dispatch center; (2) such member enable the text or SMS system; (3) such member manually enter the appropriate dispatch information into the text or SMS program; (4) such member send the appropriate message to the appropriate members; (5) the agency's members have the means by which to receive text and/or SMS messages; (6) the responding members actually receive the text or SMS message in a timely manner; (7) the responding members who receive a text or SMS message compose and send either a text or SMS reply to such message; (8) the initial transmitter of such message timely receive the replies of responders; and (9) the initial transmitter of such message, after receiving replies from responding members, transmit such information to the dispatch center in the event that an insufficient number of members have responded to the message.

If the text or SMS system is enabled and activated by the dispatch center, rather than by the dispatched team/agency, then time, resources and personnel would be required at the dispatch center for the management and activation of such systems, at significant cost to such centers. This is the case whether the system is used as a primary or supplemental notification system, but is magnified in situations where such systems are utilized as a supplemental dispatch system. Whether used as a primary or supplemental notification system, valuable time would be expended activating such systems to compose and send text or SMS messages, and to compile and review any replies thereto. Such replies would also require significant time by responding members, who would still have to: (1) have the means by which to receive text and/or SMS messages; (2) actually receive the text or SMS message in a timely manner; and (3) compose and send either a text or SMS reply to such message.

The majority of volunteer fire, ambulance and first-responder teams/agencies are not staffed twenty-four hours per day, seven days per week, and therefore frequently would not have a member available to initiate text or SMS message systems, to send text or SMS messages, to receive telephone or radio calls from responding members, or to receive and provide text, SMS, telephone or radio replies from responding members. Even combination departments (which consist of a combination of volunteer and paid staff) and career departments (which consist of fully paid staff) frequently do not have staff present at the station on a permanent basis that would be available to initiate messaging systems or to serve as telephone operators. For those agencies that might have staff available on a full time basis, such staff frequently consists of members who also reply to emergencies in the field. Thus, once that agency has been dispatched, those members cannot be stationed at a desk sending and receiving text or SMS messages, or answering telephone or radio calls.

Text and SMS systems, and the telephone and radio call reply systems addressed above, also provide information about responding members only at the point of reception of the reply messages, and not at other locations (such as at the station, the dispatch center, in the field, or mobile devices carried by members). Communication of such information to such other locations requires yet further valuable time of valuable personnel who either may not exist, or who may be more valuable in the field responding to the emergency.

Text and SMS systems are also dependent upon the timely delivery of the initial text or SMS message, and of any replies thereto by responding members. With a multitude of cellular telephone and wireless communication providers in the field, teams/agencies, dispatch centers, and members of dispatched agencies typically subscribe to cellular, text and SMS services through varying wireless providers, through which each incoming and outgoing message must be transmitted and transferred. Such transmissions are frequently accompanied by unpredictable delays of varying duration, which thereby introduces an undesirable variable, and potential delay, in the reliability and usefulness of such systems. In regions where wireless communication networks are either unavailable or unreliable, such systems simply do not function, unless a potentially responding member consumes valuable time reviewing and replying to text or SMS messages on an Internet connected computer.

Text and SMS systems are also dependent upon the dispatch originating entity maintaining an accurate and current database of the names and SMS, Text, email and/or mobile phone addresses of all of the members of all of the teams and agencies that the dispatch originating entity provides with via both outbound messages and inbound replies. This requires yet further personnel and/or personnel resources.

SUMMARY

An emergency responder reply system (ERRS) and method are disclosed that reduce the delays frequently associated with responding to emergency and other events requiring response services. In one embodiment, a method includes receiving a telephonic response from a responder to a dispatch for services; obtaining information about the responder from which the telephonic response has been received; and providing the information via a display such as an Internet-based web portal.

A first aspect of the disclosure is directed to a method comprising: receiving a telephonic response from a responder to a dispatch for services; obtaining information about the responder from which the telephonic response has been received; and providing the information via a display.

A second aspect of the disclosure is directed to a system comprising: an automated receiver that receives a telephonic response from a responder to a dispatch for services; an automated obtainer that obtains information about the responder from which the telephonic response has been received; and an Internet-based web portal accessible to a plurality of subscribers for providing the information to the plurality of subscribers.

A third aspect of the disclosure is directed to a program product stored on a computer readable medium, the computer readable medium comprising program code for enabling a computer system to: receive a telephonic response from a responder to a dispatch for services; obtain information about the responder from which the telephonic response has been received; and provide the information via an Internet-based web portal.

A fourth aspect of the invention is directed to a method for deploying a system, comprising: providing a computer infrastructure operable to: receive a telephonic response from at least one responder to a dispatch for services; obtain information about the responder from which the telephonic response has been received; and provide the information via an Internet-based web portal.

A fifth aspect is directed to a method comprising: receiving data regarding a responder to an emergency dispatch obtained from a telephonic response by the responder to the emergency dispatch; identifying the responder based on the data; and providing information about the responder and the emergency dispatch using an Internet-based web portal.

A sixth aspect is directed to a method comprising: receiving a telephonic response from a responder to an emergency dispatch and obtaining data regarding the responder from the telephonic response; and transmitting the data to a server for obtaining information about the responder based on the data and providing the information about the responder and the emergency dispatch using an Internet-based web portal.

A seventh aspect is directed to a method comprising: a responder placing a telephone response to a dispatch and providing data to identify the responder and obtain information regarding the responder; and accessing a display of information about the responder and information about the dispatch, the information about the responder obtained based on the data provided by the responder.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawings of the disclosure are not to scale. The drawings are intended to depict only typical aspects of the disclosure, and therefore should not be considered as limiting the scope of the disclosure.

DETAILED DESCRIPTION

The figures, diagrams and following description depict specific embodiments of the disclosure to teach those skilled in the art how to make and use the best mode of the disclosure. For the purpose of teaching inventive principles, some conventional aspects of the disclosure have been simplified or omitted. Those skilled in the art will appreciate variations from these embodiments that fall within the scope of the disclosure. Further, those skilled in the art will appreciate that features described below can be combined in various ways to form multiple variations of the disclosure. As a result, the disclosure is not limited to the specific embodiments described below, but only by the claims and their equivalents.

Figure 1:
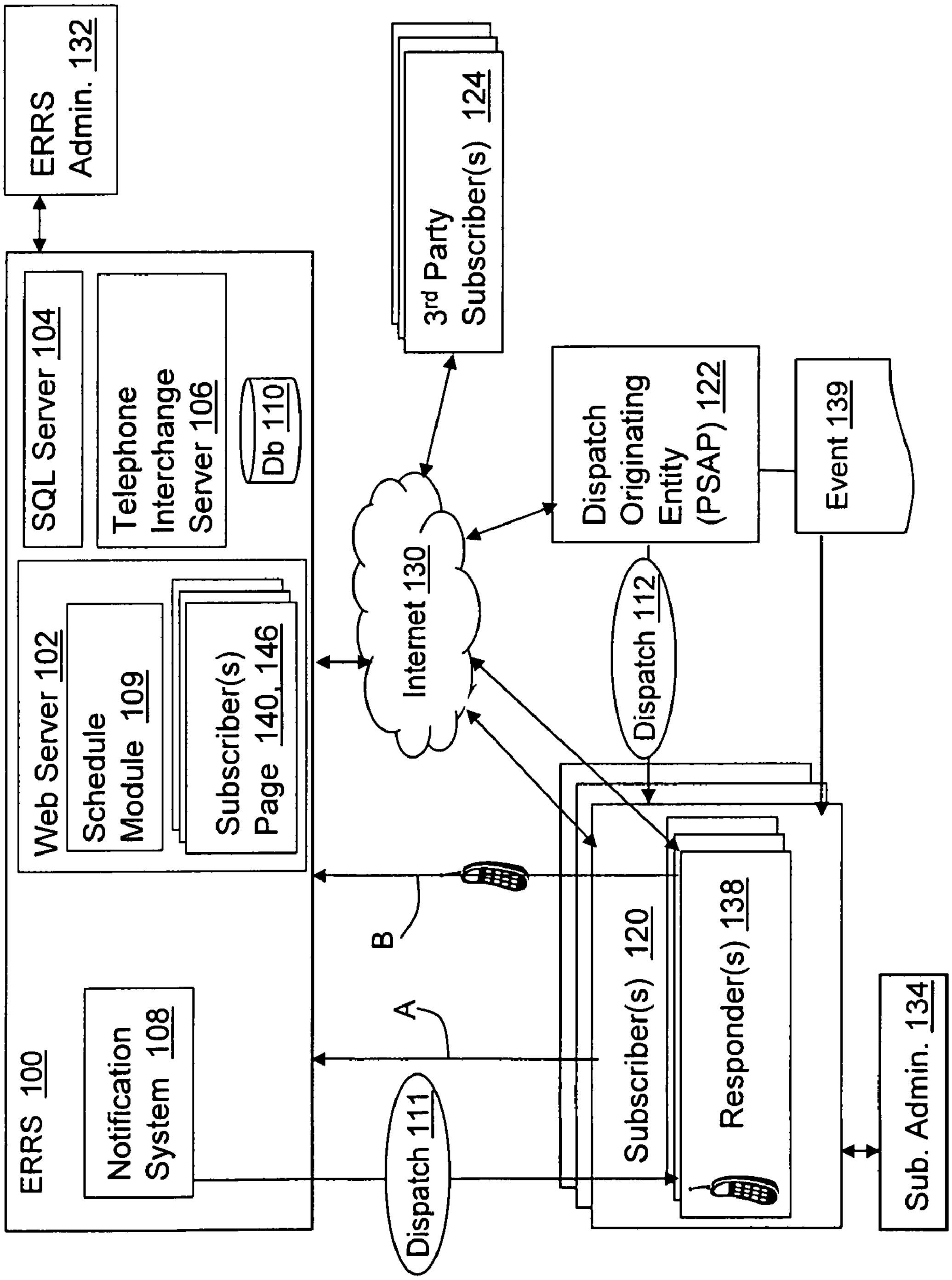
FIG. 1 shows a block diagram of an emergency responder reply system (ERRS) according to the disclosure.

Referring to FIG. 1, an emergency responder reply system (ERRS) 100, which may be subscription, Internet-based, is illustrated which serves as an interface for responders 138 of an emergency service provider (subscriber) 120, and for responders of other subscriber, service providers 122, 124 which provide a need for service to, for example, off-site employees and/or volunteers. Subscribers 120, 124 and their responders 138 receive a dispatch 111, 112—either directly or indirectly—concerning a need for services. This initiating dispatch 111 may be transmitted to responders 138 using ERRS 100, as will be described herein, or through any now known or later developed dispatch system utilized by subscribers 120 or 122, e.g. pager systems, audible horns, e-mail, text messaging, etc. In reply to dispatch 111, 112, those responders 138 of a dispatched subscriber 120 who will be responding to the dispatch telephone a pre-determined telephone number assigned to subscriber 120 by ERRS administrator (ERRS Admin.) 132. The names of responders 138, together with pertinent information about such responders, then automatically appear, e.g., within seconds, on a subscriber page 140 which may be a sub-site of an ERRS 100 web site and is unique to subscriber 120 with which responders 138 are affiliated. Related information may also automatically appear, e.g., within seconds, on a subscriber page 146 (FIG. 3) for a message originating entity 122 or third party subscriber 124.

Subscribers 120 may include any emergency service and other service providers such as but not limited to: fire departments; police; ambulance agencies and services; first-responder agencies; search and rescue teams, hazardous materials response teams, dive teams, rope rescue teams, mine safety rescue teams, and other local, state and federal technical rescue teams; incident command and/or response centers; hospitals; medical providers and provider networks; police departments; fire and burglary alarm companies; security companies; federal and state emergency management agencies; federal and state departments of homeland security; nuclear facilities; the National Geophysical Data Center; federal, state and local centers for disease control; poison control centers; state and local municipalities and agencies; service centers, utility companies, private and municipal divisions and/or departments responsible for responding to, coordinating or overseeing events requiring response services, such as disaster management teams, snow removal services, water departments, utility providers, educational institutions, and any other similar service providers which provide a need for, or provide, response services for any event or incident which requires response services. Responders 138 include members of a subscriber 120 that may respond to a dispatch 111, 112 for services assigned to subscriber 120 such as but not limited to: employees, members, affiliates, volunteers and/or leaders of subscriber 120. Dispatch originating entities 122 (also known as public safety answering points (PSAP)), may also be considered subscribers and may include any entity responsible for community-wide, local and/or regional dispatch subscribers, or the equivalent which initiate and/or coordinate a response (dispatch) to a need for services, i.e., an event 139. Third party subscribers 124 may include any of a variety of other non-emergency service-based agencies and entities which are responsible for mobilizing, coordinating or providing with off-site employees, members, affiliates and/or volunteers concerning events 139 which require the services of such individuals, or other emergency service-based individuals or agencies that are peripherally involved with event 139. For example, a third party subscriber 124 may be a hospital that is aware of a dispatch for services that may require vast resources of the hospital. In this case, the hospital may find it advantageous to monitor the response by responders 138 of subscriber 120 to determine, for example, the estimated time that hospital resources need to be ready. Third party subscribers 124 may also include local, regional or national response coordinators and/or response coordination teams, such as fire coordinators, EMS coordinators and similar individuals and entities.

1. Computer Infrastructure ERRS

FIG. 1 shows a block diagram of one embodiment of an emergency responder reply system (ERRS) 100. ERRS 100 includes a computer infrastructure that can perform the process described herein for receiving responder telephonic responses, obtaining (identifying) information about the responder and providing the information, e.g., using an Internet-based web portal. In particular, the computer infrastructure is shown including a web server 102, a structure query language (SQL) server 104 and a telephone interchange server 106. In one embodiment, telephone interchange server 106 includes an interactive voice response (IVR) system incorporating at least a voice extensible markup language (VXML) server. In an alternative embodiment, however, telephone interchange server 106 may include any system that can extract a telephone number called from and/or telephone number called from a telephonic response. In one embodiment, the computer infrastructure of ERRS 100 may also include a notification system 108, as will be described in greater detail herein. One or more databases 110 are also included for storing necessary data. Although shown as a system positioned in one geographic location, it is understood that the various components of ERRS 100 may be located in any number of geographic locations. For example, telephone interchange server 106 may be in one location and web server 102 and SQL server 104 may be in another location. Although the description shall described ERRS 100 as a subscriber-based, Internet-based system, various components, or all, of ERRS 100 may also be located at one or more locations designated or hosted by one or more subscribers 120, 122, 124. In the latter case, subscriber pages 140, 146 may simply be displayed on a monitor or similar output device, rather than over an Internet-based web portal. Where components are not geographically close, communications via the Internet, a hard-wired communication pathway or other network structure known in the art may be employed.

Each server 102, 104, 106 may include any now known or later developed infrastructure recognized or necessary for their stated operations. In general terms, each server 102, 104,

106 may include a computing device having a memory, a processor, an input/output (I/O) interface, and a bus. Further, each computing device may provide with an external I/O device/resource and a storage system, e.g. database(s) 110. As is known in the art, in general, a processor executes computer program code, such as notification system 108, that is stored in memory and/or storage system 110. While executing computer program code, a processor can read and/or write data, such as responder information, to/from the memory, storage system 110, and/or I/O interface(s). A bus provides a communications link between each of the components in the computing device. I/O device(s) can comprise any device that enables a user to interact with the computing device or any device that enables the computing device to provide with one or more other computing devices. Input/output devices (including but not limited to keyboards, displays, pointing devices, etc.) can be coupled to ERRS 100 either directly or through intervening I/O controllers.

In any event, each computing device can comprise any general purpose computing article of manufacture capable of executing computer program code installed by a user (e.g., a personal computer, server, handheld device, etc.). However, it is understood that the computing device(s) and ERRS 100 are only representative of various possible equivalent computing devices that may perform the process steps of the disclosure. To this extent, in other embodiments, the computing device(s) can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure shown is only illustrative of various types of computer infrastructures for implementing the disclosure. For example, as suggested above, in one embodiment, the computer infrastructure may comprise two or more computing devices (e.g., a server cluster) that provide over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques. ERRS 100 may also include other infrastructure necessary for providing the functions as described herein including, for example, load balancers, database files, other SQL servers, other web servers, simple mail transfer protocol (SMTP) servers, scripts, and executable files. ERRS 100 may also employ less infrastructure than described and illustrated herein, involving servers and virtual servers designed and configured to provide the functions of ERRS 100 described herein. Only those parts of the infrastructure necessary for an understanding of the invention have been illustrated for clarity.

As illustrated, a number of subscribers 120, 122, 124 may access ERRS 100 over a communications link. As discussed above, the communications link can comprise any combination of various types of communications links as is known in the art. In one embodiment, however, each subscriber 120, 122, 124 may utilize a computing device that is in communication with ERRS 100 over the Internet 130 via, for example, a web browser. It is understood that each subscriber's 120, 122, 124 means of communication with ERRS 100 may comprise the same components (processor, memory, I/O interface, etc.) as described above. These components have not been separately shown and discussed for clarity. In a further embodiment, locally hosted versions of ERRS 100 may only be accessible to a designated, limited number of subscribers 120, 122, 124.

A dispatch originating entity 122 initiates and/or coordinates a response to a need for services, i.e., an event 139. The communication of event 139 to dispatch originating entity 122 may be performed in a myriad of now known or later developed techniques. Alternatively, as also shown in FIG. 1, the need for services concerning event 139 can be provided directly to a subscriber 120 of ERRS 100. Such communication may also be conveyed in a myriad of now known or later developed techniques.

2. Operational Methodology of ERRS

A. Setup

Figure 4:
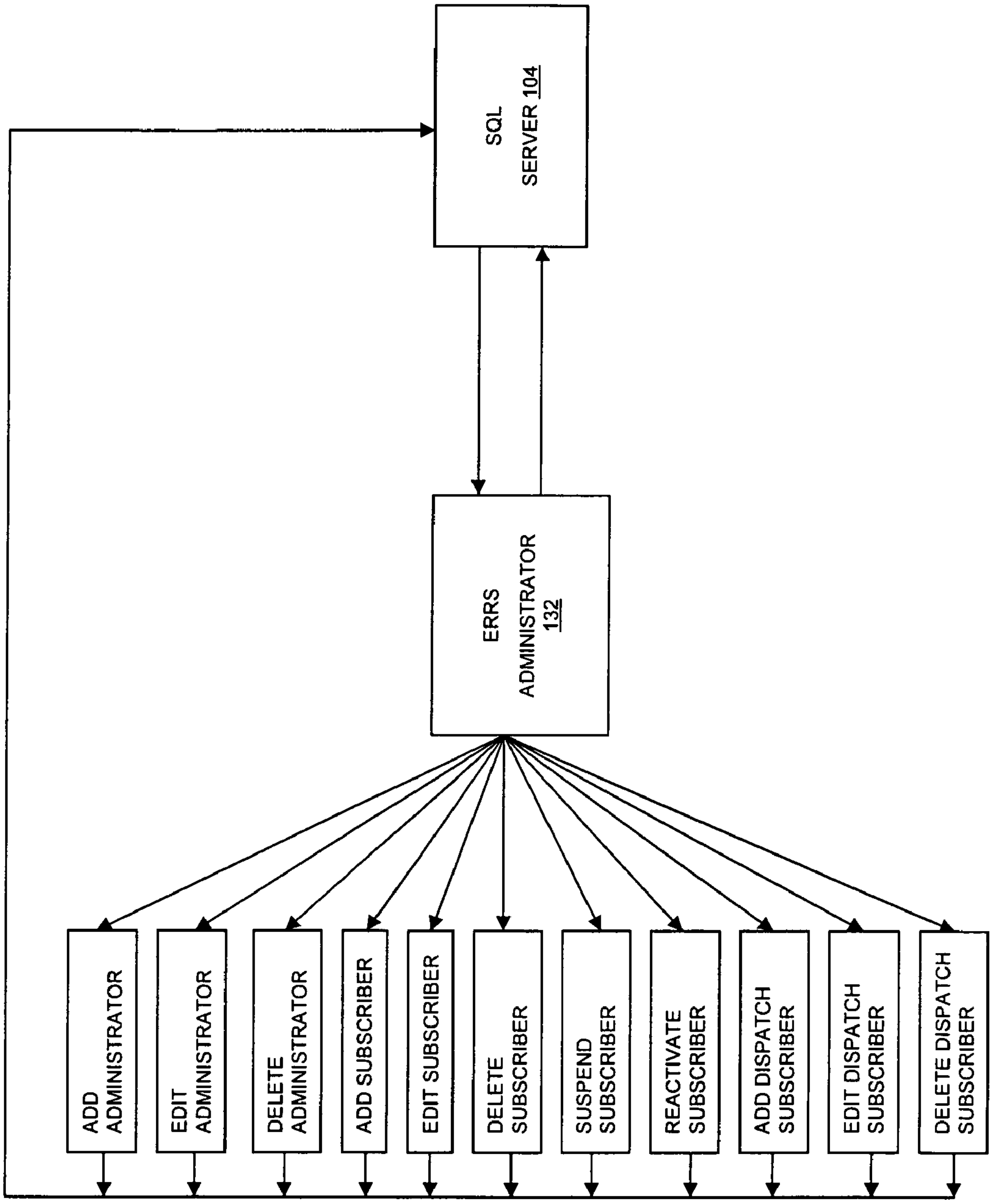
FIG. 4 shows illustrative functions for an ERRS administrator.

Upon subscribing to ERRS 100, a subscribing agency or service provider (referred to in this section only as a "setup subscriber") 120 receives a master password and master user name from the ERRS administrator(s) 132 by which specified subscriber administrator(s) (Sub. Admin.) 134 of setup subscriber 120 access a subscriber page 140 (FIG. 2) designated and established by ERRS 100 for that setup subscriber 120. The subscriber page 140 may include, for example, an Internet-based web portal provided by web server 102. Alternatively, where ERRS 100 is hosted by a subscriber 120, 122, 124, the sub-site may simply be an interactive display. The subscriber page 140 is automatically created by ERRS 100 through the entry by ERRS administrator 132 of information into a database 110 about each such setup subscriber 120 through a system administrator module (not shown), including, for example, the setup subscriber entity's name, contact information concerning the setup subscriber, information about the number of stations or facilities operated by the setup subscriber, and other demographic information. FIG. 4 shows illustrative functions an ERRS administrator 132 may perform via SQL server 104. ERRS administrator 132 also assigns telephone numbers for that setup subscriber's responders 138 to utilize to call ERRS 100 to report their status (e.g., responding, not responding, or other designated reply) in reply to a dispatch for services. As described in detail herein, ERRS 100 extracts specified information from database 110 concerning a setup subscriber 120, and creates and stores a designated subscriber page 140 (FIG. 2) for each setup subscriber 120.

Specific data concerning each setup subscriber 120 that is entered into a database 110 by ERRS administrator 132 in order to establish a new subscriber page 140 may include, but is not limited to the following: setup subscriber's agency name; setup subscriber's primary contact; the time zone in which the setup subscriber is located; the mailing and billing addresses of the setup subscriber; the county, township or equivalent in which the setup subscriber is located; the telephone and facsimile numbers of the setup subscriber; the email address of the primary setup subscriber contact; the number of stations or facilities operated by the setup subscriber; the telephone numbers assigned to the setup subscriber by the ERRS administrator; the setup subscriber's master user name and password as assigned by the ERRS administrator; and data which corresponds to data entries (voice or text) to be made by the setup subscriber's responders 138 when calling ERRS 100 in reply to a dispatch. After the requisite data concerning a new setup subscriber 120 is entered, e.g., into respective textboxes and dropdown fields, by ERRS administrator 132, a verification may be performed to verify the completeness and format of the data entered. After verification of the field entries, the data is entered into database 110.

After the creation of a new setup subscriber 120, the information concerning that subscriber can be edited at any time by ERRS administrator 132 following the same procedure as followed in creating a new setup subscriber 120. After such editing, a verification can be performed to verify the completeness and format of the data as modified, after which the edited data is entered into database 110. Subscribers 120 can be deleted from the database at any time by ERRS administrator 132. ERRS administrator 132 can also suspend and reactivate the service of subscribers 120. For example, in the event of a suspension of a subscriber 120, that subscriber's page 140 will cease to be accessible to the subscriber and its responders 138 until reactivated by ERRS administrator 132.

Figure 2:
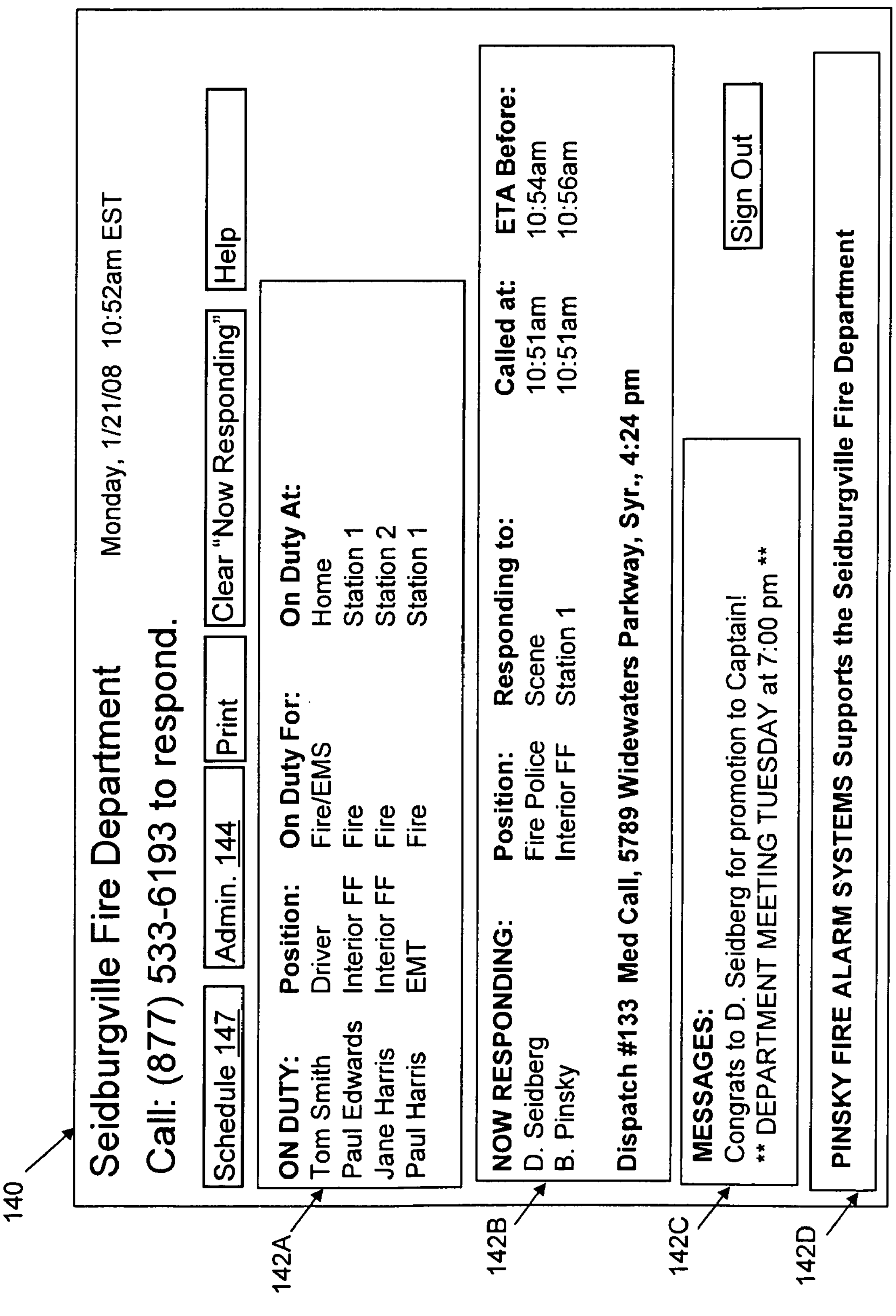
FIG. 2 shows an illustrative subscriber (web) page.

Upon the creation of a new subscriber 120 (hereinafter referred to as simply "subscriber") by ERRS administrator 132 entering the above described information into database 110, ERRS 100 automatically creates a designated website for that subscriber (referred to as the "subscriber page" 140), as shown in FIG. 2. As noted above, subscriber page 140 may be accessible by subscriber 120 and its responders 138 (and other designated subscribers 122, 124) at any location through a computing device enabled with an Internet browser through a password-protected link, e.g., of the main ERRS homepage (or functional equivalent). Subscriber page 140 may display a variety of information. For example, as shown in one example in FIG. 2, a subscriber page 140 may display the subscriber's agency name and the current date and time for the subscriber's location (periodically and automatically refreshed). In addition, subscriber page 140 may include fields for the display of information relative to current situations. For example, in one embodiment, a subscriber page 140 may include a name of the subscriber with which responder(s) are associated and four display fields 142A-D including: a) an on-duty field 142A including the responders of the subscriber currently on duty, which may include, for example, pertinent information about each available responder including name, expertise (e.g., position or certification level (Cert.))(Position), the location where the responder is on duty (On duty at:), the length of time for which the responder will be on duty (Duration) (not shown), and the service for which the responder is on duty, e.g., fire, EMS, hazmat, medical, duty chief, etc. (On duty for:); b) a now responding field 142B including the responders of the subscriber currently responding to a dispatch, which may include, for example, pertinent information about each such responder including name, expertise (e.g., position or certification level) (Position), the time of the responder's response (Called at), where the responder will respond to a dispatch (Responding to), and when the responder will arrive at the indicated destination (i.e., the estimated time of arrival of the responder) (ETA Before); c) a scrolling messages field 142C pertinent to the responders of the subscriber; and d) an advertising and/or system sponsor/partner information field 142D. Messages in the messages field 142C can be added, edited and deleted by responders 138 of subscriber 120 who have been assigned permission to do so by subscriber administrator 134 through the create and edit a responder profile functions. Other display fields in a subscriber page 140 may also be possible, including a field displaying information about the current dispatch/event in progress, as originated by either subscriber 120 or a dispatch originating entity 122.

Figure 5:
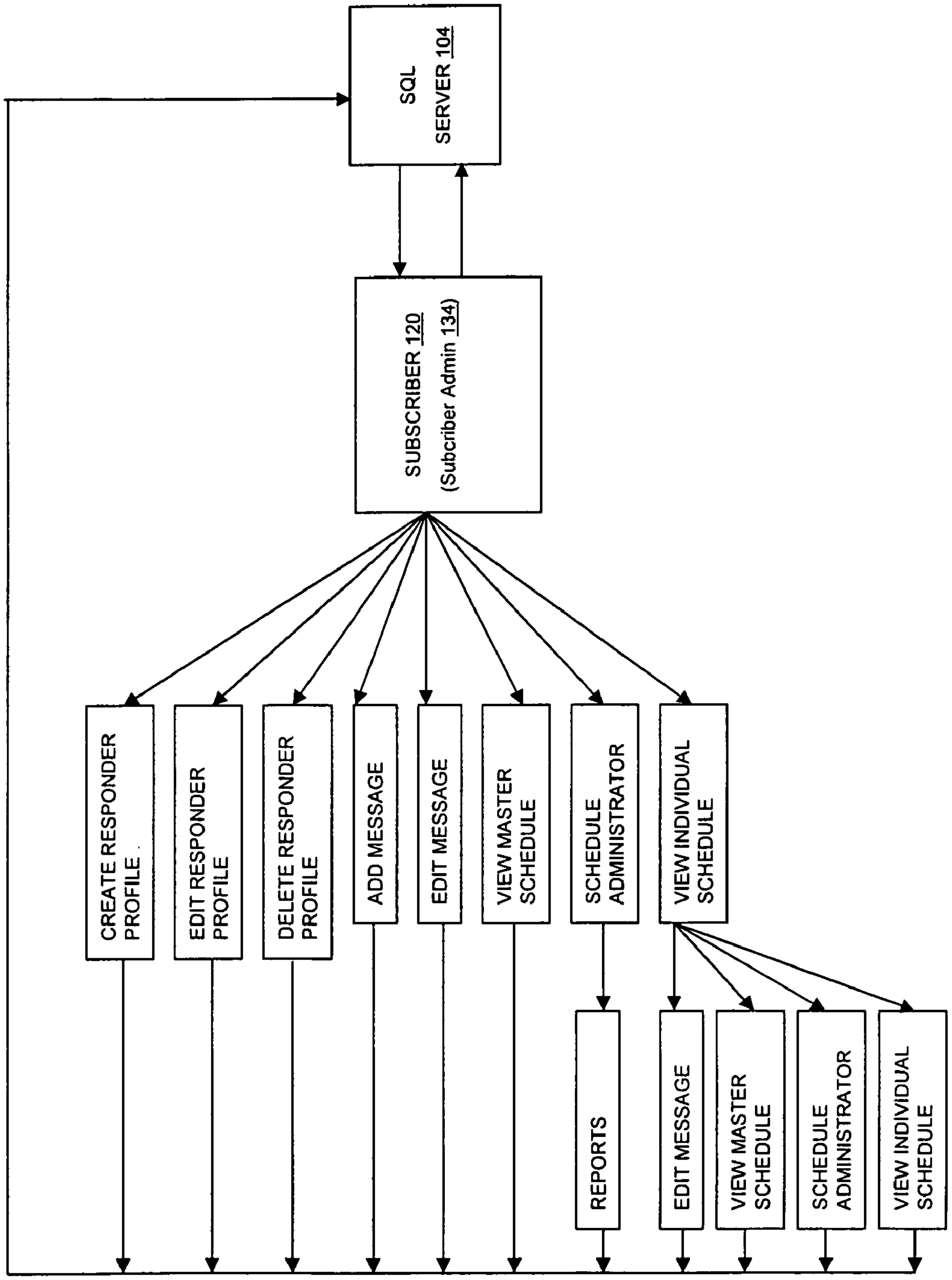
FIG. 5 shows illustrative functions for creating a subscriber.

Utilizing the master user name and master user password provided by ERRS administrator 132, a subscriber administrator 134 (as designated by subscriber 120) may access multiple functions through password protected, administrative link(s) 144 on subscriber page 140. Functions may include, for example as shown in FIG. 5 to: create a responder profile; edit a responder profile; delete a responder profile; add, edit or delete messages on the message scroll; view the subscriber's master responder schedule; add, edit and delete the individual schedules of its responders; print screens; clear display fields; and run reports concerning its responders. Each function utilized by subscriber administrator 134 which concerns data may update database 110 (FIG. 1) accordingly, after verification.

Through a 'create responder profile' function (FIG. 5), a subscriber 120 may create profiles for each of its responders 138, for example, by entering data into text fields and pulldowns. Specific data concerning each responder 138 that is entered into database 110 by subscriber 120 in order to establish a new responder profile within that subscriber's page 140 (FIG. 2) may include but is not limited to the following: responder's first and last name; a personal identification number (PIN); responder's expertise (e.g., position or certification level) within the subscriber; responder's password; responder's email address; telephone numbers of the telephones from which the responder would foreseeably call ERRS 100 when responding to a dispatch issued by the subscriber, a dispatch center, or another dispatch originating entity; responder's text message address; responder's pager address; and information pertaining to the time that it would take for that responder to respond to the subscriber's station, the scene of an incident, or any other designated location in reply to a dispatch (could be various possibilities). Permission levels may also be established by subscriber 120 for each responder 138 for the password-protected functions of subscriber page 140 accessible to each responder. A designation may also be made within the 'create responder profile' function (FIG. 5) as to whether the responder 138 is to receive automated text message notification of all responders responding to a dispatch of the subscriber. After the requisite data concerning a responder profile is entered, e.g., into respective textboxes and dropdown fields by the subscriber, a verification may be executed. After verification, the data is entered into database 110.

After the creation of responder profiles for a subscriber's responders, the information concerning that subscriber's responders may be edited at any time by the responders of the subscriber with responder profile editing privileges following the same procedure as followed in creating a new responder profile. After such editing, another verification may be executed. Subscribers can be deleted from the database at any time by responders of the subscriber with responder profile editing privileges.

Each subscriber page 140 (FIG. 2) may also include a schedule module link 147 through which responders 138 of a subscriber 120 can schedule future duty shifts by date, time, shift and duty. Duty shifts can be added, edited and deleted by responders. After duty shifts are added, edited or deleted through the schedule module 109 (FIG. 1), a verification can be performed to verify the completeness and format of the data as modified, after which the data is entered into database 110. Schedule module 109 of ERRS 100 may extract data pertinent to each responder 138 of a subscriber currently on duty, including name, expertise (e.g., position or certification level), the location where the responder is on duty, and the service for which the responder is on duty, and uploads such information to the on duty field 142A of subscriber page 140 for each subscriber. Such information is refreshed on a regular and recurring basis so that the displayed data is current for all responders 138 of a subscriber 120 currently on duty as per data inputs by responders 138 into schedule module 109. When more data lines than fit within any field 142A-D are required, the display field may, when possible, automatically scroll vertically or horizontally within the display field to display all such data lines without any manual scroll or page re-sizing by the user. As also shown in FIG. 5, responders 138 (with privileges) of a subscriber 120 can: generate reports itemizing past duty shifts, future duty shifts, and total number of hours on duty within date ranges designated by the user; and view a master schedule of that subscriber by selecting the date(s) to be viewed from a displayed calendar, and the daily calendar for the selected date(s) displays the names of responders on duty on the selected date(s), the times that each responder is on duty, and the service for which each responder is on duty. Schedule module 109 may further enable subscribers 120 to designate specific shifts, and the number of personnel (by qualification level) necessary to fill each available shift, with automated notifications being transmitted to responders 138 of each respective subscriber 120 by notification system 108 concerning open and available shifts.

Schedule module 109, as with all other functions of a subscriber's page 140, is accessible by responders 138 of subscribers 120 through any computer or device with Internet access, at any location, e.g., by accessing the ERRS home page and then entering an appropriate user name and password. A responder's schedule component of database 110 for each subscriber is periodically scanned by ERRS 100 to determine and extract information about responders on the schedule for a duty shift, so that such responders are automatically sent a text and/or email notification by ERRS 100, if such responders selected the option to receive such messages, one hour before the commencement of their schedule duty shift, and so that the on duty now display field 142A is periodically updated.

Dispatch originating entities 122 and third party subscriber 124 may also register with ERRS 100, collectively referred to as "dispatch subscribers" 122, 124. Such subscribers may be created by ERRS administrator 132 through the entry of pertinent information concerning such dispatch subscribers in a manner similar to the establishment of ordinary subscribers 120, as described more fully above. Designated subscriber pages 146 may be automatically created by ERRS 100 for each dispatch subscriber 122, 124 through the entry by ERRS administrator 132 of information into database 110 about each such subscriber including, for example: the dispatch subscriber entity's name, contact information concerning the dispatch subscriber, the dispatch territory of the dispatch subscriber, and information about the number of agencies within the dispatch subscriber's dispatch territory. After the creation of a new dispatch subscriber 122, 124, the information concerning that dispatch subscriber can be edited or deleted at any time by ERRS administrator 132 following similar procedures as described above in creating a new subscriber.

Figure 3:
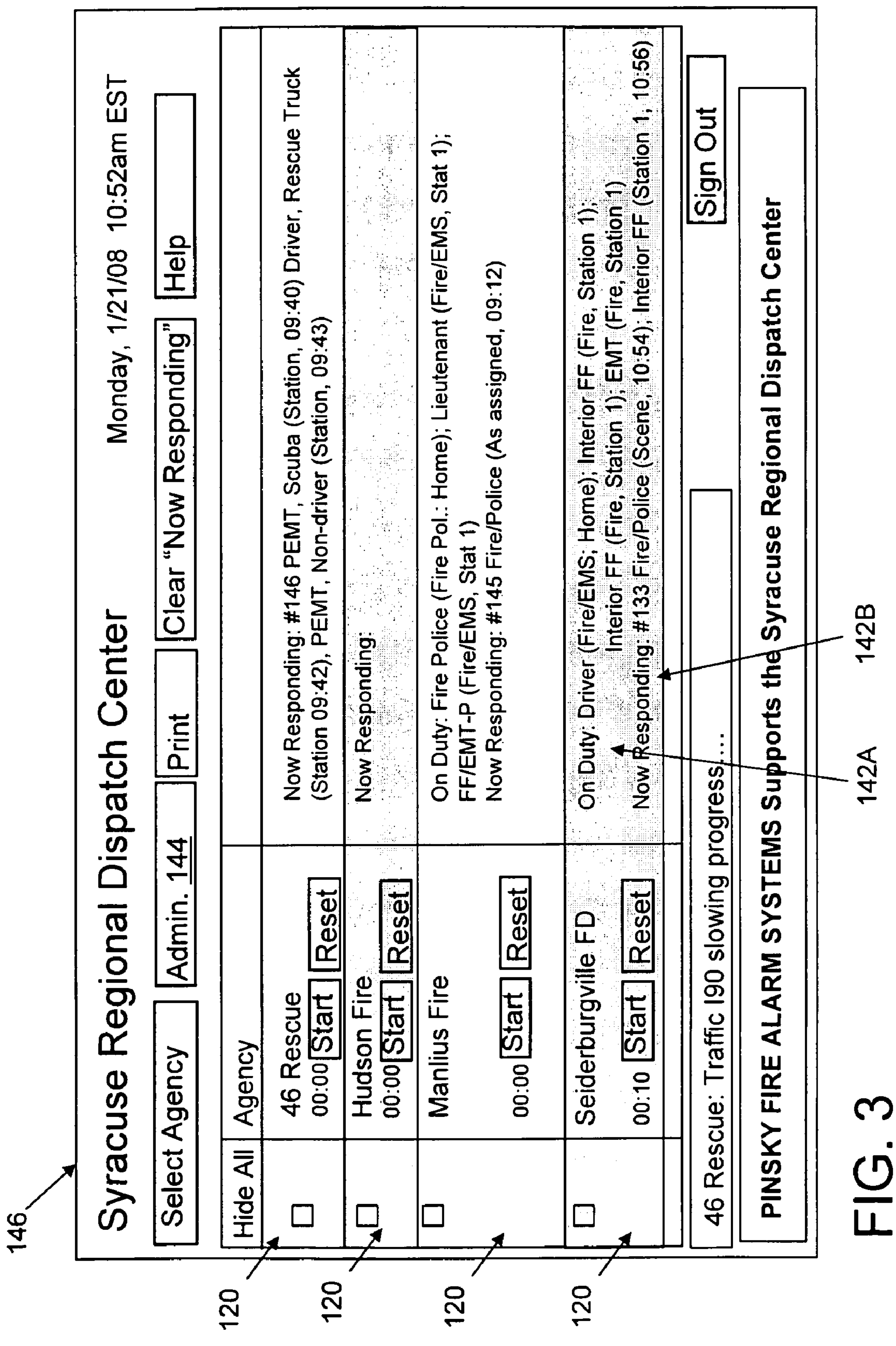
FIG. 3 shows another illustrative subscriber (web) page.

Upon the creation of a new dispatch subscriber 122, 124, ERRS 100 may automatically create a designated subscriber page 146 for that dispatch subscriber, as shown in FIG. 3. The dispatch subscriber page 146 may be accessible by dispatch subscriber 122, 124 and its employees, and by regional response coordinators, through a password-protected link of the main ERRS homepage (or functional equivalent). The dispatch subscriber page 146 may be similar to that shown in FIG. 2 except that, as shown in an example in FIG. 3, it may display information such as: an on-duty field including a list of available responders for an agency, expertise of each available responder and where stationed; a now responding field including a list of responding responders, a destination where responding and expected time of arrival of the responding responder to a dispatch; a message field from a subscriber or responder; and information about a dispatch (e.g., dispatch number). In addition, subscriber page 146 may include the dispatch subscriber's agency name, the current date and time for the dispatch subscriber's location, and links to each subscriber 120 located within the dispatch subscriber's dispatch territory (which links are regularly updated by ERRS 100). The information for each subscriber 120 in subscriber page 146 matches that information for their respective subscriber page 140 (FIG. 2). As with subscriber page 140, all data displayed on subscriber page 146 is continually and automatically refreshed by ERRS 100.

After utilizing a user name and password provided by the ERRS administrator to access its dispatch subscriber page 146 (FIG. 3), a dispatch subscriber 122, 124 can select any, or several, subscriber(s) 120 located within its dispatch territory through links on its designated subscriber page 146. Upon the selection of a subscriber entity from its page 146, the dispatch subscriber page displays, for example, the on duty field 142A (FIG. 2) and now responding field 142B (FIG. 2) of the selected subscriber 120, as currently viewable and continually refreshed on the subscriber's page 140, such that the dispatch subscriber 122, 124 is able to view the same information as the selected subscriber concerning responders 138 currently on duty and/or responding to a dispatch. Dispatch subscribers 122, 124 can enable or disable timers pertaining to each dispatch and/or event, can enable, start, stop and resent timers pertaining to each dispatch, can enable or disable name display functions, and can access and run reports of response call logs of subscribers within the relevant dispatch region. Typically, dispatch subscriber 122, 124 has no privileges to access any functions of the selected subscriber's page 140, other than optional privileges to clear the now responding display field 142B of designated subscribers 120, and does not view any of the other display fields of the selected subscriber's page 140.

B. Operational Methodology

Figure 6:
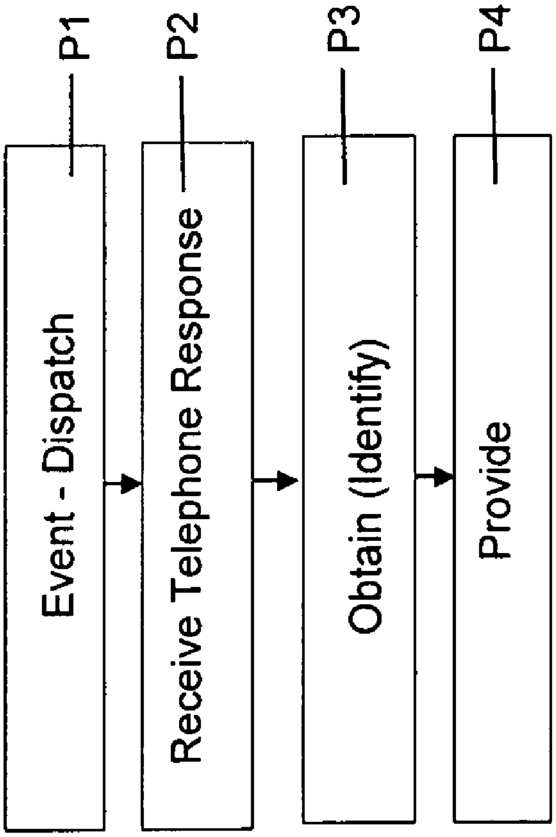
FIG. 6 shows a flow diagram of an embodiment of an operational methodology according to the disclosure.

Referring to FIG. 6, a flow diagram of embodiments of an operational methodology of ERRS 100 will now be described.

In process P1, a number of preliminary activities occur relative to an event 139 (FIG. 1) that is the initiator of a need for services. In particular, event 139 is reported to either subscriber 120 or dispatch originating entity 122. The communication of event 139 to subscriber 120 or dispatch originating entity 122 may be performed in any manner now known or later developed. In any case, a dispatch 111, 112 to subscriber 120 and its responders 138 for services is generated. The providing of dispatch 112 from a dispatch originating entity 122 to responders 138 may be performed using any now known or later developed technique, e.g., a pager or text messaging system, and does not constitute part of the invention. That is, subscribers 120 and their responders 138 receive a dispatch (notification) 111, 112—either directly or indirectly—concerning a need for services through already existing dispatch systems unrelated to ERRS 100. This initiating dispatch 111, 112 can be transmitted to responders 138 by or through any dispatch originating entity 122 (outbound notification system) currently utilized by subscribers 120, or through any new or subsequent dispatch system utilized by such subscribers. The functioning of ERRS 100 is independent of the means by which the initial dispatch is transmitted or conveyed to responders 138, and utilizes such dispatch notification merely as an initiating event. In an alternative embodiment according to the present disclosure, where a subscriber 120 is the recipient of event 139 notification, subscriber 120 may send a request (arrow A in FIG. 1) for a dispatch 111 to ERRS 100. A notification system 108 of ERRS 100 receives the request for a dispatch for services from subscriber 120, and notifies the required responders 138 (responder(s)) of dispatch 111. The dispatch 111 notification may be by, for example: a text message or email message delivery function which transmits messages through Internet 130, or a text-to-voice communication function which transmits messages to the selected responders 138. In any case, dispatch 111 or 112 notification occurs prior to receiving any response from responders 138.

In process P2, ERRS 100 receives a telephonic response (arrow B in FIG. 1) from a responder 138 in response to a dispatch 111, 112 for services. More specifically, upon dispatch 111 of responders 138 of subscriber 120 by that subscriber 120 or upon dispatch 112 by any dispatch originating entity 122, the responders 138 of that subscriber who are ready and able to respond to event 139 place a telephone call to a telephone number assigned to that subscriber by ERRS administrator 132. The assigned telephone number can be dialed by each respective responder 138, for example, either in its entirety, or by pressing a single digit entry corresponding to a preprogrammed speed dial function on the telephone(s) utilized by the responder. The telephone call to ERRS 100 by each respective responder 138 can be made from any telephone, regardless of the name of the person or entity registered with the telephone service provider as the account holder for that telephone.

Figure 7:
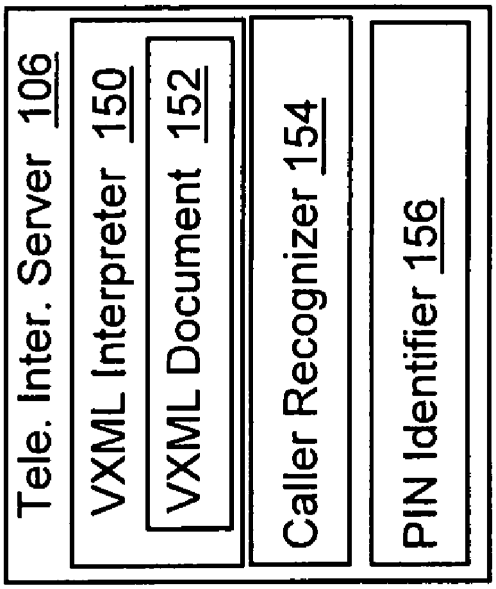
FIG. 7 shows a block diagram of an embodiment of a telephone interchange server.

In one embodiment, upon the connection of a responder to ERRS 100 via a telephone response to a telephone number assigned to a subscriber 120, as shown in FIG. 7, a telephone interchange server 106 activates a VoiceXML interpreter 150 to automatically answer the telephone response (call) and start executing a VoiceXML document 152. Telephone interchange server 106 may include any now known or later developed infrastructure to allow for performance of the described functioning herein. For example, telephone interchange server 106 may include a multitude of telephone ports, a gateway, voice and/or dual-tone multiple frequency (DTMF) interpreters, voice browsers, automatic speech recognition and/or speech synthesis (text-to-speech and speech-to-text) and VXML scripts, documents and executable files. In the preferred embodiment of the disclosure, such telephone responses can be made from any telephone (whether wired, wireless, private branch exchange (PBX), voice over internet protocol (VoIP), voice over computer (VoC), satellite, etc) with DTMF signaling capability. In a further embodiment of the disclosure, such telephone responses can be made from any telephone with voice capability. Under VXML document's 152 control, VXML interpreter 150 may perform functions such as but not limited to: (a) sending vocal prompts, messages, or other audio material to the user; (b) accepting numeric input entered by the user by DTMF (telephone key tone) signals; (c) accepting voice input and activating voice recognition features; (d) accepting voice input and recording such input without activation of voice recognition features; (e) accepting voice input and recording such input with activation of voice recognition features; (f) transmitting user's information to web server 102; and/or (g) receiving information from ERRS 100 through Internet 130 and transmitting it to responder 138. Telephone interchange server 106 may perform this function concurrently for a plurality of responders 138.

From the telephone response of each responder 138 to ERRS 100 via a subscriber telephone number assigned by ERRS administrator 132, telephone interchange server 106 captures data points that may include, for example: a time of the telephone response; a telephone number the responder 138 called (via, e.g., dialed number identification service (DNIS) of a telephone service such as Verizon); a PIN for the responder 138; a telephone number the responder 138 called from (via, e.g., an automatic number identification (ANI) service of a telephone service such as Verizon); and/or a voice or text entry by the responder 138 in response to a prompt. Furthermore, VXML interpreter 150 may also prompt responder 138 for a variety of additional information. For example, VXML interpreter 150 may prompt responder 138 to input voice or numerical entries to determine: expertise, whether the responder is responding to the dispatch for services, the location to which the responder will be responding (e.g., scene, station, or elsewhere) and/or an anticipated response time. Further, VXML interpreter 150 may prompt responder 138 for a numerical entry which will correspond to a pre-determined message, as determined by subscriber 120, and as entered into database 110. Based on the time of a telephone response, ERRS 100 may calculate an estimated response time of the responder to the dispatch. After VXML interpreter 150 captures the requisite information, VXML interpreter 150 may automatically conclude and disconnect the telephone call. It is understood that where telephone interchange server 106 does not include VXML capabilities, e.g., it includes only DTMF and/or ANI capabilities, the data gathered may not include voice-based data.

In process P3, ERRS 100 obtains information about the responder 138 from which a telephonic response has been received. As part of this process ERRS 100 identifies responder 138. More specifically, information extracted from the telephone response received by ERRS 100 is compared to ERRS database 110 to determine whether a responder 138 match is available in the database. Each responder 138 can be identified by ERRS 100 in a number of ways. In one embodiment, where the telephone response is made from any telephone regularly or foreseeably used by that responder 138 (home, business, mobile, a friend or relative's telephone, or any other telephone that may foreseeably be used by that responder to contact the ERRS application) and entered into that responder's responder profile, a caller recognizer 154 may automatically identify each responder 138 based on the telephone number from which the responder called by finding a match to that telephone number in that responder's profile. Where ERRS 100 handles a number of subscribers 120 and a responder 138 is a member of more than one subscriber 120, call recognizer 154 may also require the number the responder 138 called, which may be subscriber 120 specific, so that call recognizer 154 can obtain the correct data for that responder relative to that subscriber such that the correct information can be obtained from database 110. In an alternative embodiment, a PIN identifier 156 automatically identifies the responder 138 based on the personal identification number (PIN) that may have been entered by the responder. Where a responder 138 is a member of more than one subscriber 120, he/she may have different PINs for each subscriber 120. In this case, telephone interchange server 106 must also capture a personal identification number (PIN) of the responder 138 during the telephone response.

In one embodiment, ERRS administrator 132 may assign two telephone numbers to each subscriber 120, one of which allows identification of responders 138 of subscriber 120 by the telephone number they called from and/or called to, and another that requires input of a responder's PIN. In this fashion, a responder 138 can select in which manner they are identified. It is understood, however, that use of caller recognizer 154 and PIN identifier 156 are not necessarily mutually exclusive. In addition, while caller recognizer 154 and PIN identifier 156 are shown as part of telephone interchange server 106; it is understood that they may be located in a number of different locations and may function in a number of different ways. For example, in a further embodiment, caller recognizer 154 and PIN identifier 156 functions may be performed by program code of ERRS 100, as stored on web and SQL servers 102, 104.

Once a responder 138 has been identified, ERRS 100 obtains information regarding the responder. ERRS 100 may obtain the information in a number of ways such as, but not limited to: pulling it from database 110, obtaining it from data from the telephone response and/or calculating it (e.g., an ETA) from information pulled form the database or obtained from the telephone response. In addition, the obtaining may include obtaining additional information relative to, for example, a subscriber 120 such as: an on-duty field including a list of available responders 138 for the subscriber 120, expertise of each available responder and where stationed; a now responding field including a list of responding responders, a destination where responding and expected time of arrival of the responding responder to a dispatch; a message field from a subscriber or responder; and information about a dispatch. The information may also include data regarding subscriber 120, 122, 124 such as: name, local time, a duty roster of responders available for the subscriber, a list of responders who have provided with ERRS 100 in reply to a dispatch, and/or a message from a subscriber or responder, etc.

In process P4, ERRS 100 provides the information via a display, i.e., in the form of subscriber pages 140, 146. In one embodiment, the providing includes providing the information via an Internet-based web portal. Alternatively, where ERRS 100 is hosted by a subscriber 120, 122, 124, the providing may simply entail display of the information, e.g., via a monitor rather than via an Internet-based web portal. As noted above, the information may be obtained from database 110 and/or obtained from the telephone response and/or calculated from information pulled from the database or obtained from the telephone response, and posted to the subscriber page 140, 146 which corresponds with the identified responder. In one embodiment, the information may include, as shown in FIG. 2, for each responder 138: an identification, expertise, the subscriber with which the responder is associated, where the responder will respond to the dispatch, and/or when the responder will arrive at an indicated destination. In another embodiment, additional information may include, for example, as shown in FIG. 3, for a subscriber 120: an on-duty field including a list of available responders 138 for an agency, expertise of each available responder and where stationed; a now responding field including a list of responding responders, a destination where responding and expected time of arrival of the responding responder to a dispatch; a message field from a subscriber or responder; and information about a dispatch. Furthermore, the information may include any of the data described herein relative to subscriber page 140, 146 (FIGS. 2 and 3). The additional information may also include data regarding subscriber 120, 122, 124 such as: name, local time, a duty roster of responders available for the subscriber, a list of responders who have provided with ERRS 100 in reply to a dispatch, and/or a message from a subscriber or responder, etc.

Web server 102 uploads the information to the subscriber's subscriber page 140, 146. Consequently, the information is provided to a plurality of subscribers, responders and third party subscribers that can access ERRS 100 including, for example: an initiator of a dispatch 111, 112 (e.g., dispatch originating entity 122 (PSAP)), a responding agency (i.e., subscriber 120) to which the at least one responder belongs, responders 138 and third party entities (i.e., third party subscribers 124). Each time that a telephone response is placed to ERRS 100 by a responder 138 of a subscriber 120 that results in the requisite identification (i.e., matching of data points), the corresponding subscriber page 140, 146 is automatically updated and refreshed by ERRS 100 with the specified information for each responder. When more data lines pertaining to responders of a subscriber responding to a dispatch are uploaded to that subscriber's now responding field 142B of subscriber page 140 than fit within the display field, the display field can, when possible, automatically scroll vertically within the display field to display all such data lines without any manual scroll or page re-sizing by the user.

In addition to the above-described information about a subscriber's responders 138 being continually uploaded to the subscriber's subscriber page 140, 146, the same information that is uploaded may be designated to be automatically forwarded by ERRS 100 via text message and/or email to the designated responders 138 of that subscriber 120 who enabled that feature through their responder profile.

If there is no identification of the responder 138 (i.e., no match of the requisite data points) for a single subscriber 120, no new data will upload to any subscriber page. For all data uploaded to a subscriber page 140, 146, the times of telephone responses and estimated time of arrival are adjusted by ERRS 100 to correct for any time zone variances between the location where the call was received by ERRS 100 and the location of subscriber 120. In a further embodiment of the disclosure, a responder 138 will be informed by VXML interpreter 150 while still connected to ERRS 100 via telephone that he/she is not identified within ERRS 100. In this case, the non-identified responder 138 may be informed to either add the telephone number from which the call was placed to that responder's list of telephone numbers through the edit a responder's profile function of the subscriber's sub-site, or to re-enter the responder's PIN number.

The information uploaded to each subscriber's subscriber page 140, 146 is viewable over the Internet 130 from any location at all times by that subscriber 120, 122, 124, by responders 138 of that subscriber, by responders 138 of that subscriber who elect to receive such information via text message and/or email through the responder profile functions, by that subscriber's dispatch center (i.e., dispatch originating entity 122), by ERRS administrator 132, and by any other designated information recipients (i.e., third party subscriber 124) as designated by the subscriber and/or the ERRS administrator. No action is required by any such information recipients to have immediate viewing access to such information other than logging into ERRS 100 via a user name and password provided by either ERRS administrator 132 or subscriber administrator 134. In one embodiment, upon accessing ERRS 100, responders 138 of subscribers 120 are directed to the subscriber page 140 for the subscriber with whom they are affiliated. Upon reaching that subscriber page 140, such responders 138 are able to view the above described information such as: the names and pertinent information about all responders of that subscriber currently on duty; the names and pertinent information of all responders of that subscriber who have reported that they are responding to a dispatch; scrolling messages posted by other responders of that subscriber; and information concerning the current dispatch(es) and/or event(s) 139 requiring services. Depending upon the system permission levels granted to the responder 138, the responder 138 can also perform functions including: viewing duty schedules; entering and editing duty shifts; posting or editing scrolling messages; sending text, email and/or text-to-voice messages to other responders of that subscriber (either individually or via group messaging functions); run database reports applicable to the subscriber with who he/she is affiliated; and add, edit or delete either their own user profile or the responder profiles of other responders of the subscriber with who he/she is affiliated.

By accessing ERRS 100 in the manner described herein, responders 138 of subscribers 120 are able to access real-time information from any location about all of the responders of the subscriber responding to a dispatch for services, without having to participate in, or receive, any person-to-person voice or data communications directly from any such responders. Decisions can be immediately made by subscribers 120 about whether additional personnel are needed, and such further need can be immediately provided either directly to such additionally needed personnel by one or more responders 138 of subscriber 120, or through a dispatch originating entity 122, either through notification system 108 and a further dispatch 111, or by a dispatch originating entity 122 and a further dispatch 112.

Dispatch originating entities 122 or third party subscriber 124 for which designated subscriber pages 146 have been established can also access ERRS 100 from any location via the Internet 130 through any device equipped with a web browser through secure log in functions. Upon accessing the ERRS application, dispatch originating entities 122 (and third party subscribers 124) are able to view information for each subscriber 120 within that entity's 122, 124 region such as the name, position and duty assignment of each responder of each subscriber currently on duty; and the name, position, qualifications, responding location and response time of each responder of each subscriber who has provided with ERRS 100 to report that he/she is responding to a dispatch 111, 112. Dispatch originating entities 122 are also able to activate timers applicable to communications initiated by that or any other dispatch originating entity 122, and to generate database reports of caller response information of responders of subscribers within their region. By accessing ERRS 100 in the method described herein, dispatch originating entities 122 are able to access real-time information about all responders of all subscribers responding to a dispatch 111, 112 without having to participate in, or receive, any voice or data communications directly from any such responders.

An unlimited number of subscribers 120, responders 138 of subscribers 120, subscriber administrators 134, dispatch originating entities 122, etc., can concurrently access ERRS 100 and view their respective subscriber pages 140, 146. ERRS 100 may be configured to save and store session information each time the system is accessed by an entity. In the event of a user's Internet communication failure at the user's point of access of ERRS 100, ERRS 100 may store all session data of the user who experienced a communication failure on the user end of the system, and may continue to seek and provide data to the communication device that was being used by the user to access the ERRS system for up to twelve (12) hours to re-establish an internet connection. Upon the re-establishment of an Internet connection, the accessing user's communication device will be fully restored to its prior session, without any need for the user to log back into the system or to navigate to the sub-site that was being accessed.

The system described herein reduces the delays associated with first and second activation timeframes, and of any subsequently necessary dispatches, by providing immediate, real time information to emergency, medical and incident response service providers, their teams, team leaders, team responders, response coordinators, and dispatchers, about which of their responders will be responding to an incident, when they will be responding, and where they will be responding. The system provides emergency, medical and incident response service providers, their teams, team leaders, team responders, response coordinators, dispatchers, and other designated recipients (hereinafter collectively "information recipients"), with immediate, real-time pertinent information about responders, including: the name of each responder responding to the dispatch; the time that each responder is responding to the dispatch; the expertise of each responder; the location to which the responder is responding (e.g. to the scene of the event, to a designated station of the agency, or to any other location); and the estimated time of arrival of the responder at the location to which the responder is responding. ERRS provides this information without requiring the activation or implementation of any new or supplemental dispatch service or application, without requiring the time or allocation of any new or additional personnel in connection with the dispatch process, without the requirement of any new or unique hardware, and without unduly consuming the time or efforts of dispatchers or responders.

Responders simply dial one telephone number on any telephone in order to inform their team/agency and dispatcher that they are responding to a dispatch. This can be accomplished simply and quickly by pre-programming a speed-dial function on a telephone so that only one button will typically need to be pressed by such responders. ERRS 100 then automatically displays pertinent information about such responders via the Internet on monitors at the responders' agency, at the dispatch center, and at any other authorized remote locations.

3. Miscellany

As discussed herein, various systems and components are described as "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system, it is understood that the disclosure further provides various alternative embodiments. That is, the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to provided the functionality described herein. For the purposes of this description, a computer-usable or computer readable medium can be any apparatus that can contain, store, provide, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer readable medium include a semiconductor or solid state memory, such as memory, magnetic tape, a removable computer diskette, a random access memory (RAM), a read-only memory (ROM), a tape, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processing unit coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In another embodiment, the disclosure provides a method of generating a system for carrying out the above-described functionality. In this case, a computer infrastructure, such as computer infrastructure, can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device, from a computer-readable medium; (2) adding one or more computing devices to the computer infrastructure; and (3) incorporating and/or modifying one or more existing systems of the computer infrastructure, to enable the computer infrastructure to perform the process steps of the disclosure.

In still another embodiment, the disclosure provides a business method that performs the process described herein on a subscription, advertising, and/or fee basis. That is, a service provider, such as an Internet or software-as-a-service (SaaS) service or hosting provider, could offer to provided the functionality as described herein. In this case, the service or hosting provider can manage (e.g., create, maintain, support, etc.) a computer infrastructure, such as computer infrastructure, that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, scripts, executable files, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A method for providing a notification service that is independent of any outbound notification service that originates a dispatch for services, the method comprising:

receiving a telephonic response from a responder to the dispatch for services regardless of how the responder becomes aware of the dispatch for services, and obtaining an indication of whether the responder is responding to the dispatch for services;

identifying the responder from which the telephonic response has been received; and providing for display, the identity of the responder and the indication.

2. The method of claim 1, wherein the identifying includes identifying the responder based on a telephone number from which the responder called matching a telephone number stored in a profile for the responder.

3. The method of claim 2, wherein the identifying further includes identifying the responder based on a telephone number to which the responder called matching a telephone number stored for a subscriber with which the responder is associated.

4. The method of claim 1, wherein the identifying includes identifying the responder based on a personal identification number (PIN) entered by the responder matching a PIN in a stored profile of the responder.

5. The method of claim 1, wherein the receiving includes capturing at least one of a time of the telephonic response, a telephone number the responder called, a telephone number the responder called from, a voice or text entry by the responder in response to a prompt, or a personal identification number.

6. The method of claim 1, further comprising obtaining and providing at least a portion of additional information about a subscriber with which the responder is associated, the additional information including at least one of: an on-duty field including a list of available responders for the subscriber including expertise of each available responder and where stationed; a now responding field including a list of responding responders, a destination where responding, an expertise of each responding responder and expected time of arrival of the responding responder to a dispatch; a message field from a subscriber or responder; or information about a dispatch.

7. The method of claim 1, further comprising calculating an estimated response time of the responder to the dispatch.

8. The method of claim 1, wherein the telephonic response includes at least one of the following regarding the responder: the indication whether the responder is responding to the dispatch for services, anticipated response time, expertise, or where the responder will respond to the dispatch.

9. The method of claim 1, wherein the providing includes providing to a plurality of users selected from the group consisting of: an initiator of the dispatch, a responding agency to which the responder belongs, responders, and third party entities.

10. The method of claim 1, wherein the receiving includes receiving a telephonic response from a number of a plurality of responders substantially simultaneously, and the providing includes providing the identity and the indication of each responder.

11. The method of claim 1, further comprising receiving the dispatch for services from a subscriber, and notifying the responder of the dispatch prior to the receiving.

12. The method of claim 1, wherein the providing includes providing the identity and the indication via an Internet-based web portal.

13. A system for providing a notification service that is independent of any dispatch originating entity that originates a dispatch for services, the system comprising:

an automated receiver that: receives a telephonic response from a responder to a dispatch for services regardless of how the responder becomes aware of the dispatch for services, and obtains an indication of whether the responder is responding to the dispatch for services;

an automated identifier that identifies the responder from which the telephonic response has been received; and an Internet-based web portal accessible to a plurality of users for providing the identity of the responder and the indication of whether the responder is responding to the dispatch for services to the plurality of users, wherein the automated receiver, the automated identifier and the Internet-based web portal are independent of the dispatch originating entity.

14. The system of claim 13, wherein the identifier identifies the responder based on a telephone number from which the responder called matching a telephone number stored in a profile for the responder.

15. The system of claim 14, wherein the identifier further identifies the responder based on a telephone number to which the responder called matching a telephone number stored for a subscriber with which the responder is associated.

16. The system of claim 13, wherein the identifier identifies the responder based on a personal identification number (PIN) entered by the responder matching a PIN in a stored profile of the responder.

17. The system of claim 13, wherein the receiver captures at least one of: a time of the telephonic response, a telephone number the responder called, a telephone number the responder called from, a voice or text entry by the responder in response to a prompt, or a personal identification number.

18. The system of claim 13, further comprising an automated obtainer for obtaining information about the response, wherein the information includes at least one of the following regarding the responder: expertise, a subscriber with which the responder is associated, where the responder will respond to the dispatch, or when the responder will arrive at an indicated destination, and wherein the Internet-based web portal further provides at least a portion of the information.

19. The system of claim 18, wherein the obtainer further obtains and the Internet web-based portal further provides at least a portion of additional information about a subscriber with which the responder is associated, the additional information including at least one of: an on-duty field including a list of available responders for the subscriber including expertise of each available responder and where stationed; a now responding field including a list of responding responders, a destination where responding, an expertise of each responding responder and expected time of arrival of the responding responder to a dispatch; a message field from a subscriber or responder; or information about a dispatch.

20. The system of claim 13, further comprising a calculator for calculating an estimated response time of the responder to the dispatch.

21. The system of claim 13, wherein the telephonic response includes at least one of the following regarding the responder: anticipated response time, expertise, or where the responder will respond to the dispatch.

22. The system of claim 13, wherein the plurality of users are selected from the group consisting of: an initiator of the dispatch, a responding agency to which the responder belongs, responders and third party entities.

23. The system of claim 13, wherein the receiver receives a telephonic response from a number of a plurality of responders substantially simultaneously, and the Internet-based web portal provides the identity and the indication about each responder.

24. The system of claim 13, further comprising a notification system that receives the dispatch for services from a subscriber, and notifies the responder of the dispatch.

25. A program product stored on a non transitory computer readable medium, the non transitory computer readable medium comprising program code to provide a notification service that is independent of any outbound notification system that originates a dispatch for services, the program code enabling a computer system to:

receive a telephonic response from a responder to the dispatch for services regardless of how the responder becomes aware of the dispatch for services, and obtain an indication of whether the responder is responding to the dispatch for services;

identify the responder from which the telephonic response has been received; and provide the identity and the indication via an Internet-based web portal.

26. The program product of claim 25, wherein the identify program code identifies the responder based on a telephone number from which the responder called matching a telephone number stored in a profile for the responder.

27. The program product of claim 26, wherein the identify program code further identifies the responder based on a telephone number to which the responder called matching a telephone number stored for a subscriber with which the responder is associated.

28. The program product of claim 25, wherein the identify program code identifies the responder based on a personal identification number (PIN) entered by the responder matching a PIN in a profile for the responder.

29. The program product of claim 25, wherein the receive program code captures at least one of: a time of the telephonic response, a telephone number the responder called, a telephone number the responder called from, a voice or text entry by the responder in response to a prompt, or a personal identification number.

30. The program product of claim 25, further comprising program code for obtaining information about the responder, wherein the information includes at least one of the following regarding the responder: expertise, the subscriber with which the responder is associated, where the responder will respond to the dispatch, or when the responder will arrive at an indicated destination, and wherein the provide program code provides at least a portion of the information via the Internet-based web portal.

31. The program product of claim 30, wherein the obtain program code further obtains additional information about a subscriber to which the responder is associated, the additional information including at least one of: an on-duty field including a list of available responders for an agency, expertise of each available responder and where stationed; a now responding field including a list of responding responders, a destination where responding, an expertise of each responding responder, and expected time of arrival of the responding responder to a dispatch; a message field from a subscriber or responder; or information about a dispatch, and wherein the provide program code provides at least a portion of the additional information via the Internet-based web portal.

32. The program product of claim 25, further comprising program code for enabling the computer system to calculate an estimated response time of the responder to the dispatch.

33. The program product of claim 25, wherein the telephonic response includes at least one of the following regarding the responder: anticipated response time, expertise or where the responder will respond to the dispatch.

34. The program product of claim 25, wherein the provide program code provides to a plurality of users selected from the group consisting of: an initiator of the dispatch, a responding agency to which the responder belongs, responders, or third party entities.

35. The program product of claim 25, wherein the receive program code receives a telephonic response from a number of a plurality of responders substantially simultaneously, and the providing includes providing the information about the responder.

36. The program product of claim 25, further comprising program code for causing the computer system to receive the dispatch for services from a subscriber, and notify the responder of the dispatch prior to the receiving.

37. A method for deploying a system for providing a notification service that is independent of any dispatch originating entity that originates a dispatch for services, the system comprising:

providing a computer infrastructure for performing the following:

receiving a telephonic response from a responder to the dispatch for services regardless of how the responder becomes aware of the dispatch for services, and obtaining an indication of whether the responder is responding to the dispatch for services;

identifying the responder from which the telephonic response has been received; and providing the identity and the indication via an Internet-based web portal.

38. A method for providing a notification service that is independent of any dispatch originating entity that originates an emergency dispatch, the method comprising:

receiving data regarding a responder to the emergency dispatch regardless of how the responder becomes aware of the emergency dispatch, the data obtained from a telephonic response by the responder to the emergency dispatch, the data including an indication as to whether the responder is responding to the emergency dispatch;

identifying the responder based on a portion of the data matching data stored in a profile for the responder; and providing information about the responder and the emergency dispatch using an Internet-based web portal, the information including the identity of the responder and the indication as to whether the responder is responding to the emergency dispatch.

39. A method for providing a notification service that is independent of any outbound notification system that originates an emergency dispatch, the method comprising:

receiving a telephonic response from a responder to the emergency dispatch regardless of how the responder becomes aware of the emergency dispatch, and obtaining data regarding the responder from the telephonic response, the data including an indication as to whether the responder is responding to the emergency dispatch; and transmitting the data to a server for:

obtaining information about the responder based on a portion of the data matching data stored in a profile for the responder, the information including an identity of the responder, and providing the identity of the responder and the indication using an Internet-based web portal.

40. The method of claim 1, further comprising obtaining an expertise of the responder based in the stored profile of the responder, wherein the providing further includes providing the expertise of the responder.

41. The method of claim 1, further comprising obtaining an indication of where the responder will respond to the dispatch, wherein the providing further includes providing the indication of where the responder will respond to the dispatch for services.

42. The method of claim 1, further comprising obtaining an identity of a subscriber with which the responder is associated.

43. The method of claim 1, further comprising obtaining an indication of when the responder will arrive at an indicated destination, wherein the providing further includes providing the indication of when the responder will arrive at the indicated destination.

44. A system for providing a notification service that is independent of any dispatch originating entity that originates a dispatch for services, the system comprising:

a database storing a profile for a plurality of responders, each responder associated with a subscriber that is associated with a dispatch originating entity that originates the dispatch for services;

an automated receiver that: receives a communication from a responder to the dispatch for services regardless of how the responder becomes aware of the dispatch for services, and obtains an indication of whether the responder is responding to the dispatch for services;

an automated identifier that identifies the responder from which the communication has been received using the profiles in the database; and an Internet-based web portal accessible to a plurality of users for providing the identity of the responder and the indication of whether the responder is responding to the dispatch for services to the plurality of users, wherein the database, the automated receiver, the automated identifier and the Internet-based web portal are independent of the dispatch originating entity.

45. The method of claim 1, wherein the Internet-based web portal further provides an indication of where the responder is responding to the dispatch for services.

* * * * *